United States Patent
Tang et al.

(10) Patent No.: US 12,088,494 B2
(45) Date of Patent: Sep. 10, 2024

(54) LEVERAGING A HYBRID USAGE OF SOFTWARE AND HARDWARE TO SUPPORT A MULTI-TIERED NEXTHOP FAILOVER TO BACKUP NEXTHOP HANDLING

(71) Applicant: Arista Networks, Inc., Santa Clara, CA (US)

(72) Inventors: Tim Tang, Burnaby (CA); Mayukh Saubhasik, Richmond (CA)

(73) Assignee: Arista Networks, Inc., Santa Clara, CA (US)

( * ) Notice: Subject to any disclaimer, the term of this patent is extended or adjusted under 35 U.S.C. 154(b) by 310 days.

(21) Appl. No.: 17/398,308

(22) Filed: Aug. 10, 2021

(65) Prior Publication Data

US 2022/0052941 A1  Feb. 17, 2022

Related U.S. Application Data

(60) Provisional application No. 63/066,118, filed on Aug. 14, 2020.

(51) Int. Cl.
*H04L 12/707* (2013.01)
*H04L 43/0811* (2022.01)
*H04L 45/00* (2022.01)

(52) U.S. Cl.
CPC .......... *H04L 45/22* (2013.01); *H04L 43/0811* (2013.01)

(58) Field of Classification Search
CPC ..... H04L 45/22; H04L 43/0811; H04L 45/28; H04L 45/745; H04L 41/0654
See application file for complete search history.

(56) References Cited

U.S. PATENT DOCUMENTS

| | | | |
|---|---|---|---|
| 2014/0098669 A1* | 4/2014 | Garg | H04L 45/38 370/235 |
| 2017/0054630 A1* | 2/2017 | Liang | H04L 45/64 |
| 2021/0377160 A1* | 12/2021 | K | H04L 45/64 |

* cited by examiner

*Primary Examiner* — Walli Z Butt
(74) *Attorney, Agent, or Firm* — Tianyi He

(57) ABSTRACT

In general, in one aspect, embodiments relate to a network device for forwarding packets as part of a network comprising an adjacent device connected to the network device via a link. The network device includes a switching system for directing the packets between ports of the network device, wherein a port of the ports is operably connected to the adjacent device via the link, and a switching system manager programmed to: identify a failure of the link, in response to identifying the failure of the link, perform a multi-tiered next hop failover of the switching system based on the failure of the link to obtain an updated switching system that does not forward the packets using the failed link, and forward a portion of the packets using the updated switching system.

20 Claims, 13 Drawing Sheets

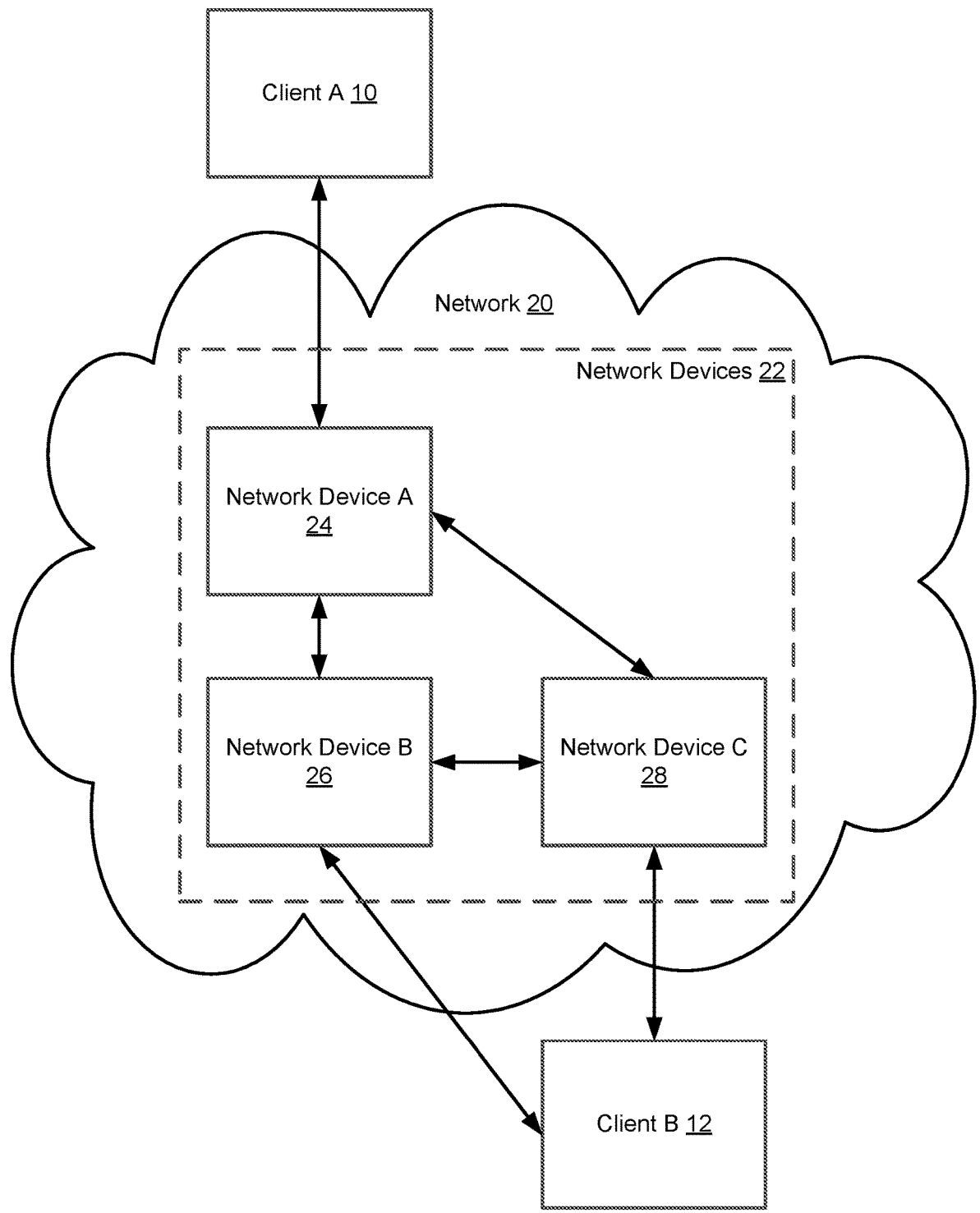
FIG. 1.1

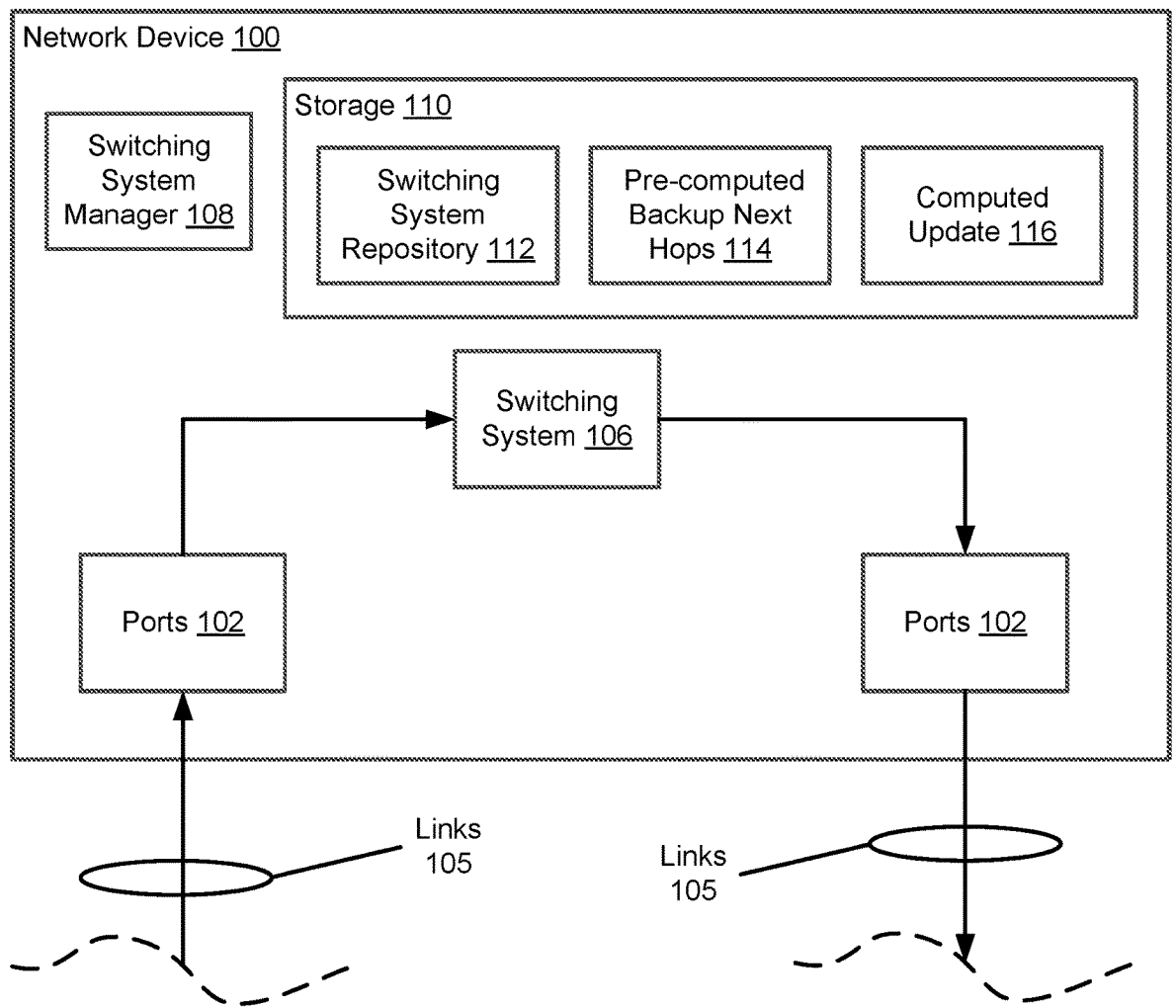
FIG. 1.2

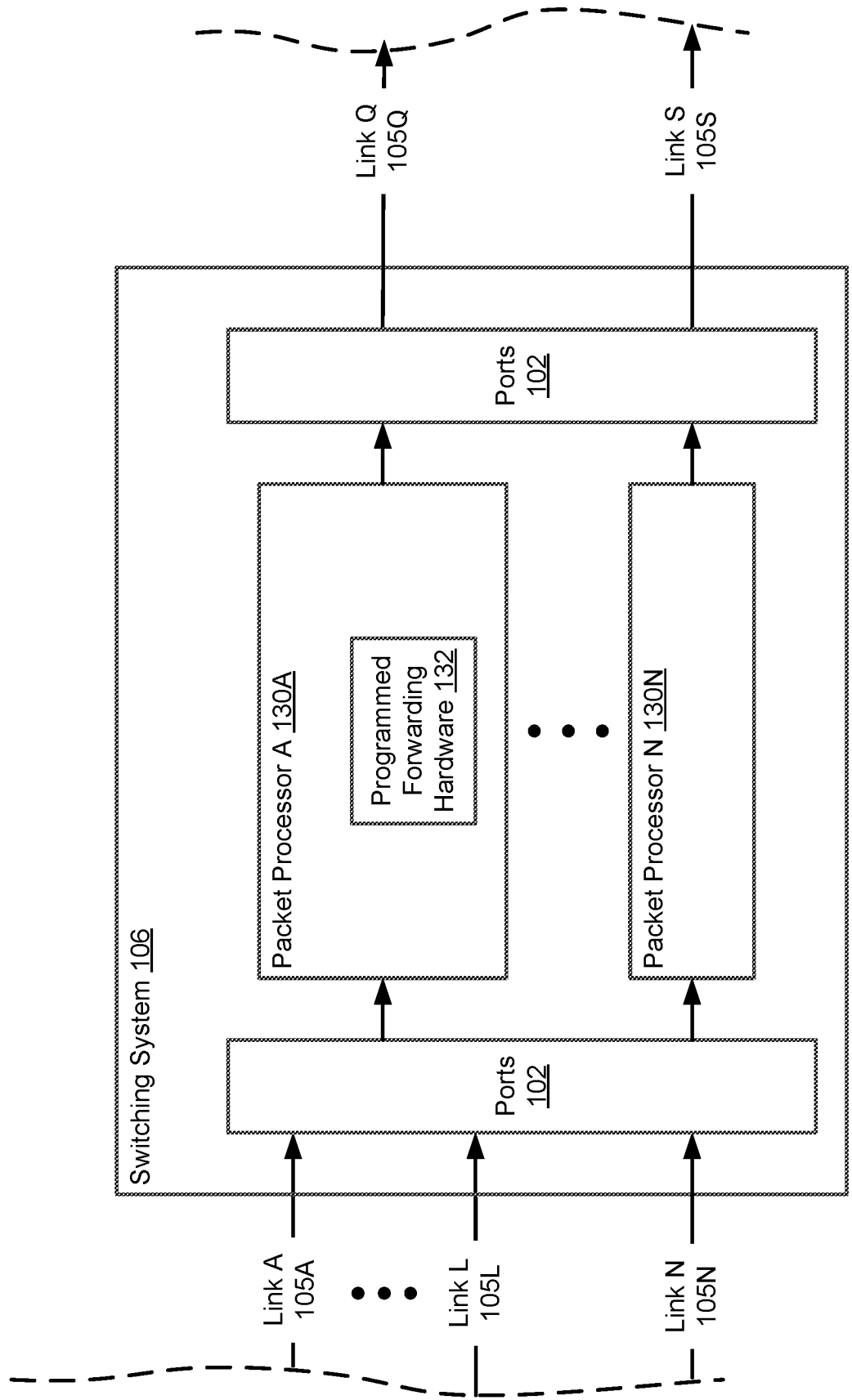
FIG. 1.3

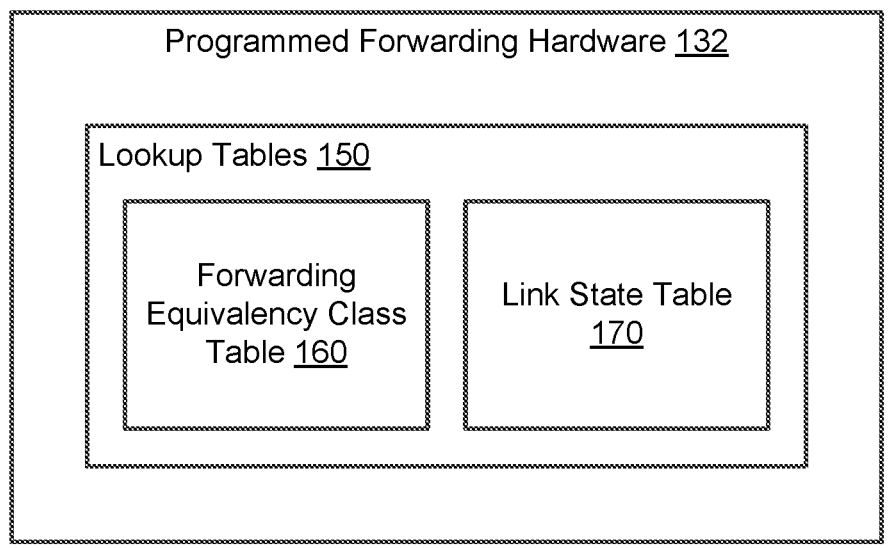
FIG. 1.4

Forwarding Equivalency Class Table 160

Next Hop Backup Protected Entries 162

Next Hop Backup Protected Entry A 164A

• • •

Next Hop Backup Protected Entry N 164N

Next Hop Backup Unprotected Entries 166

FIG. 1.5

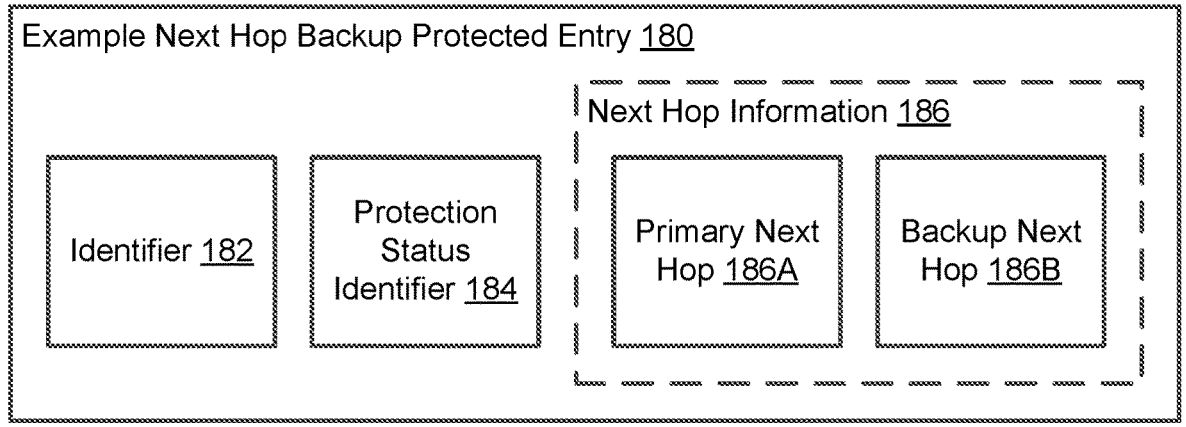
FIG. 1.6

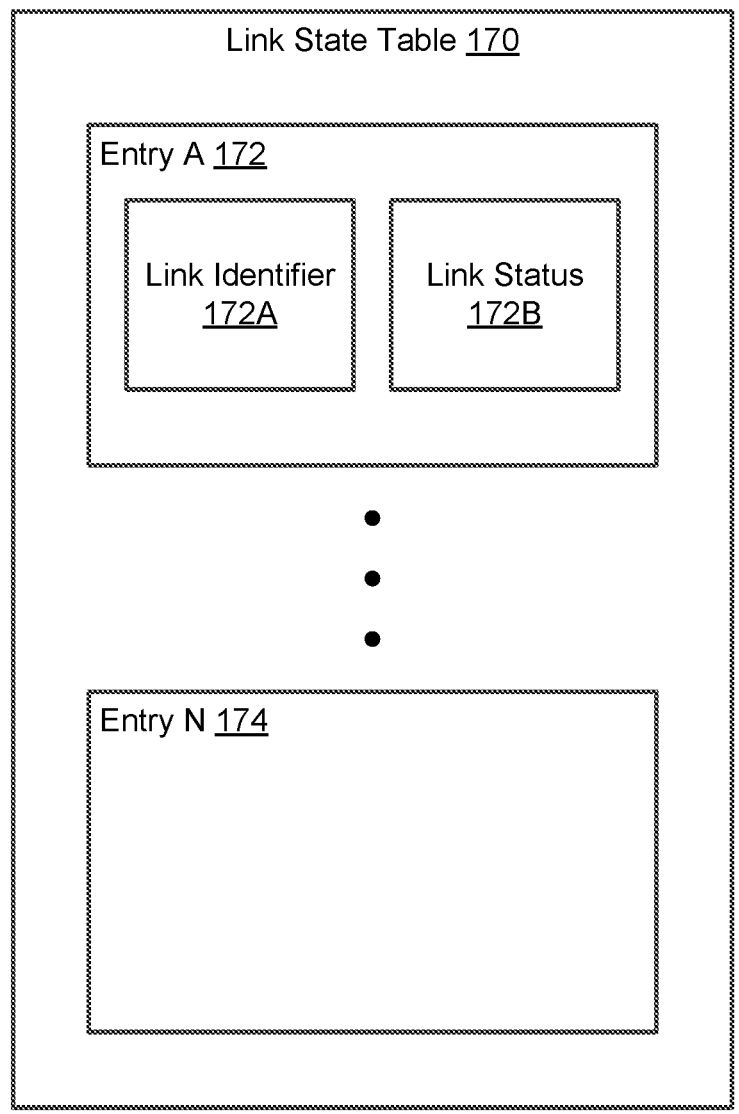
FIG. 1.7

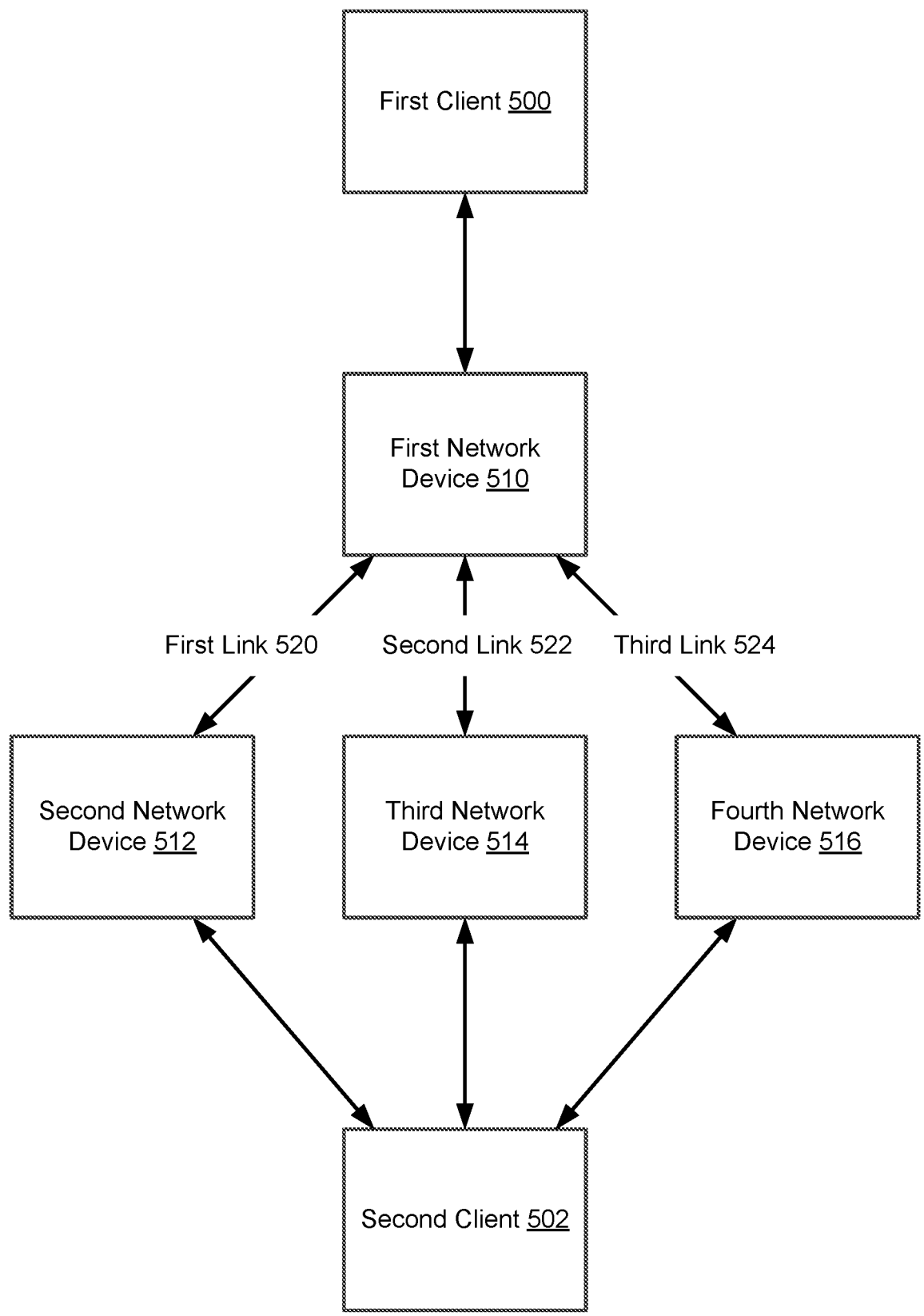
FIG. 5.1

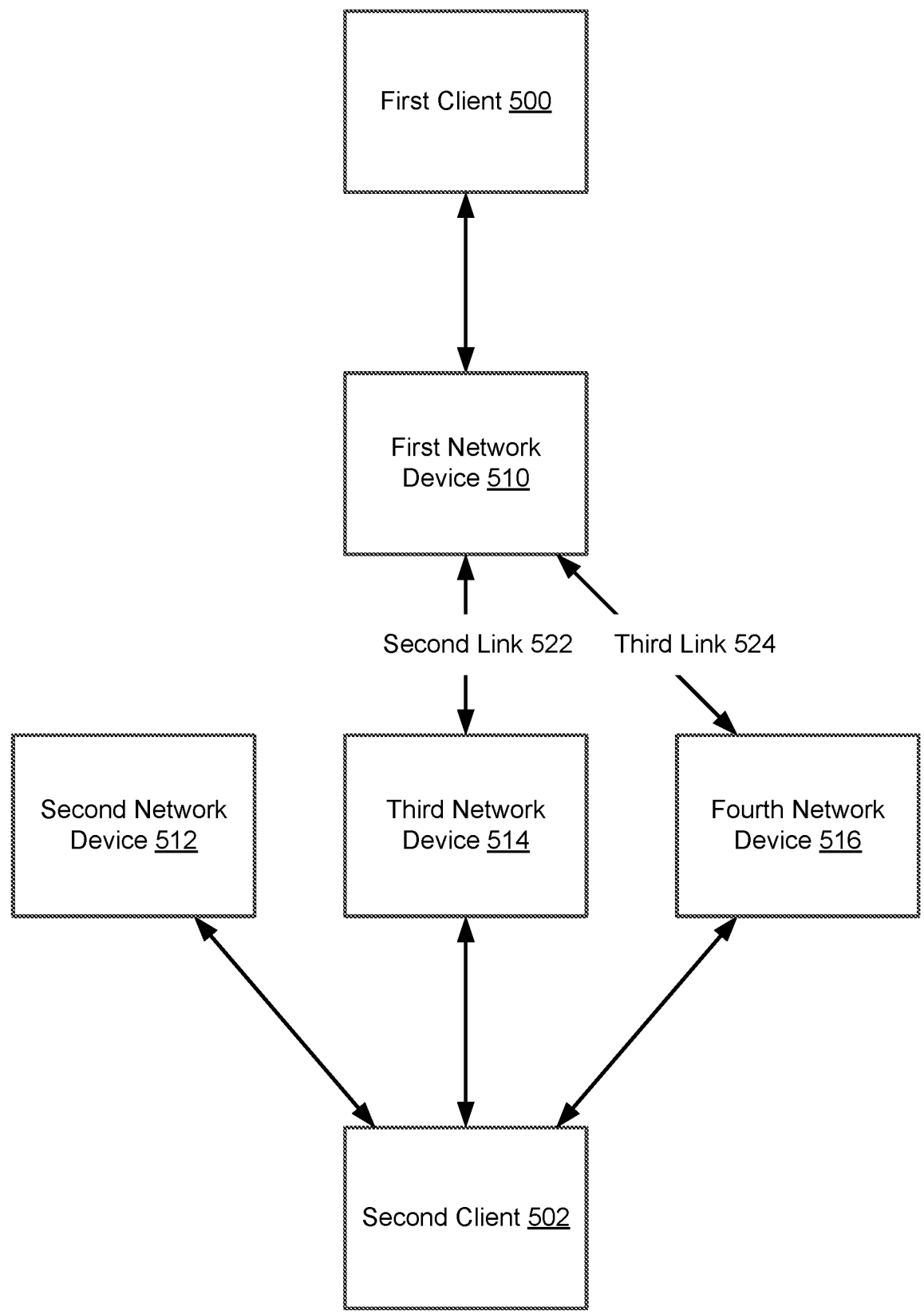
FIG. 5.2

LEVERAGING A HYBRID USAGE OF SOFTWARE AND HARDWARE TO SUPPORT A MULTI-TIERED NEXTHOP FAILOVER TO BACKUP NEXTHOP HANDLING

CLAIM OF BENEFIT AND INCORPORATION BY REFERENCE

This application claims the benefit of U.S. Provisional Application No. 63/066,118, filed on Aug. 14, 2020, and titled "LEVERAGING A HYBRID USAGE OF SOFTWARE AND HARDWARE TO SUPPORT A MULTI-TIERED NEXTHOP FAILOVER TO BACKUP NEXTHOP HANDLING." U.S. Provisional Application No. 63/066,118 is incorporated by reference.

BACKGROUND

Multiple devices may communicate with each other to provide their respective functionalities. For example, the devices may send data representing information necessary for the multiple devices to provide their functionalities.

BRIEF DESCRIPTION OF DRAWINGS

Certain embodiments will be described with reference to the accompanying drawings. However, the accompanying drawings illustrate only certain aspects or implementations of the disclosed embodiments by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 1.3 shows a diagram of a switching system in accordance with one or more embodiments disclosed herein.

FIG. 1.4 shows a diagram of forwarding hardware in accordance with one or more embodiments disclosed herein.

FIG. 1.5 shows a diagram of a forwarding equivalency class table in accordance with one or more embodiments disclosed herein.

FIG. 1.6 shows a diagram of an entry of a forwarding equivalency class table in accordance with one or more embodiments disclosed herein.

FIG. 1.7 shows a diagram of a link state table in accordance with one or more embodiments disclosed herein.

FIGS. 5.1-5.2 show diagrams of the operation of an example system over time in accordance with one or more embodiments disclosed herein.

DETAILED DESCRIPTION

Figure 2:
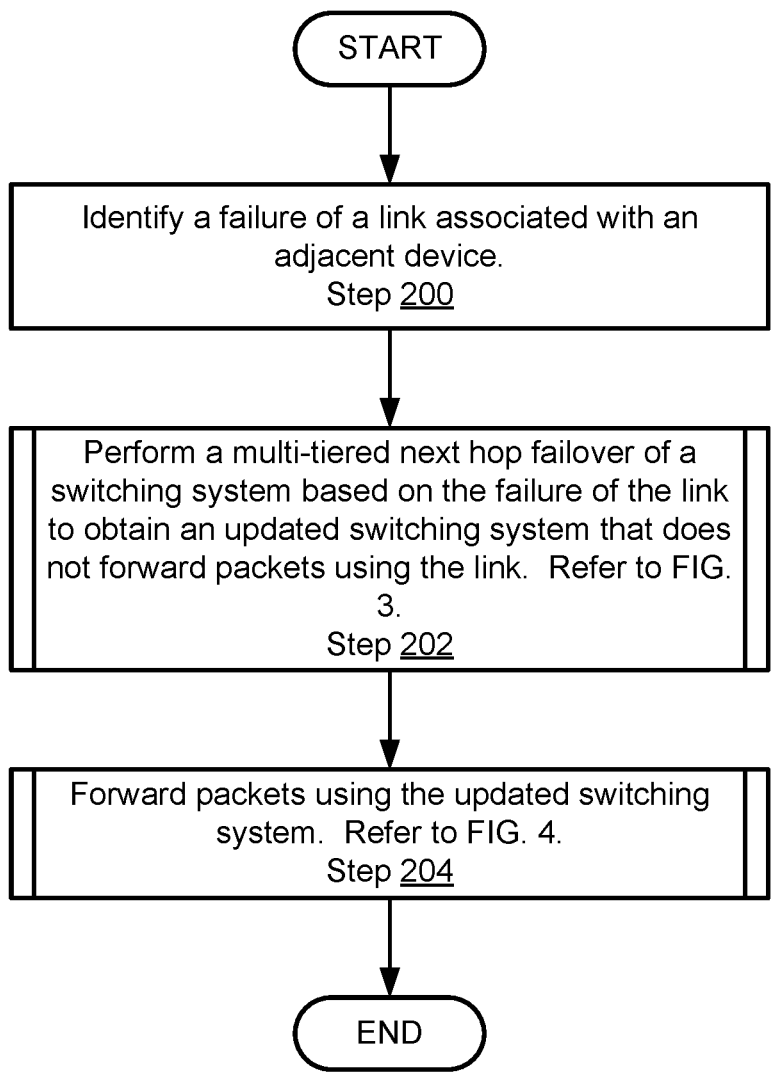
FIG. 2 shows a flowchart of a method of responding to a link failure in accordance with one or more embodiments disclosed herein.

Networks may include devices (e.g., network devices, clients, etc.) that generate, send, receive, and/or forward packets. A packet may be a data structure that includes one or more portions that include data (e.g., a payload) to be transmitted using the packet and one or more portions that include information that may be used to determine where to send the packet (e.g., control information).

To efficiently determine where to send packets, a network device may obtain information about the network environment in which the network device resides. The network device may use the information about the network in which it resides (and/or other information) to program specialized hardware (e.g., packet processors) that determines where packets it receives are to be sent (e.g., forwarding behavior). The packet processors may utilize the programming and the control information from the packets to decide whether to send the packet to another device, the workflow for sending the packet, and other aspects of servicing received packets.

If the network environment in which the network device resides changes (e.g., link failures, device failures, device additions, link additions, etc.), the programming of the packet processors may become out of date (e.g., stale). Stale programming of the packet processors may cause the network devices to make an undesirable decision with respect to servicing received packets. For example, the network processors may cause the network devices to send the packets on links that are inoperable. Consequently, the packets may be lost, may end up stored in buffers for undesirable durations of time, or may otherwise be serviced by the network devices in an undesired manner.

Embodiments disclosed herein may provide systems and methods for managing packet processors to reduce undesirable packet forwarding behavior. To manage the network processors, a multi-tiered approach may be used to handle changes in network topology in which a network device resides.

The multi-tiered approach may include, in response to identifying a change in network topology: (i) updating the forwarding behavior of the network device using information that is pre-programmed into the network device hardware (e.g., in the packet processors), (ii) updating the forwarding behavior of the network device by reprogramming the packet processors using pre-computed updates, (iii) computing updates to the programming of the packet processors based on current network state information and updating the forwarding behavior of the network device by reprogramming the packet processors using the computed updates, and (iv) using network communications standards based reprogramming of the network processors to further update the forwarding behavior of the network device. By implementing the multi-tiered approach, the forwarding behavior of network devices may be more quickly updated to match changes in network topology. Consequently, undesirable forwarding behavior of network devices due to stale programming may be reduced. Further, the multi-tiered approach enables the network device to attempt to continue to forward packets even when there is a failed link by attempting to select a next hop that is most optimal from the set of available next hops while at the same time limiting the amount of dropped packets.

For example, a network device may first attempt to use a backup next hop (which may be the most optimal next hop and also the fastest next hop to use). If there is no backup next hop, then the network device may attempt to reprogram a next hop for a given route using a pre-computed next hop (which was determined based on the state of the network prior to the failure of the link). This second attempt may be less optimal than the first attempt to use the backup next hop; however, this pre-computed next hop may be efficiently implemented. Thus, the second provides a trade-off between optimal packet forwarding and efficient updating of the network device when there is a link failure. Finally, regardless of whether the first and second approaches were successful, the network device takes steps to update the next hops using the current state of the network (i.e., taking into account the failed link). This subsequent processing may result in more optimal forwarding than the first and second attempts, however, this processing make take (on a relative basis) significantly longer to update the forwarding behavior of the networking device. In the text that follows, a description of components of a system in accordance with embodiments disclosed herein is provided with respect to FIGS. 1.1-1.4. A description of data structures that may be used by the system of FIG. 1.1 is provided with respect to FIGS. 1.5-1.7.

Figure 3:
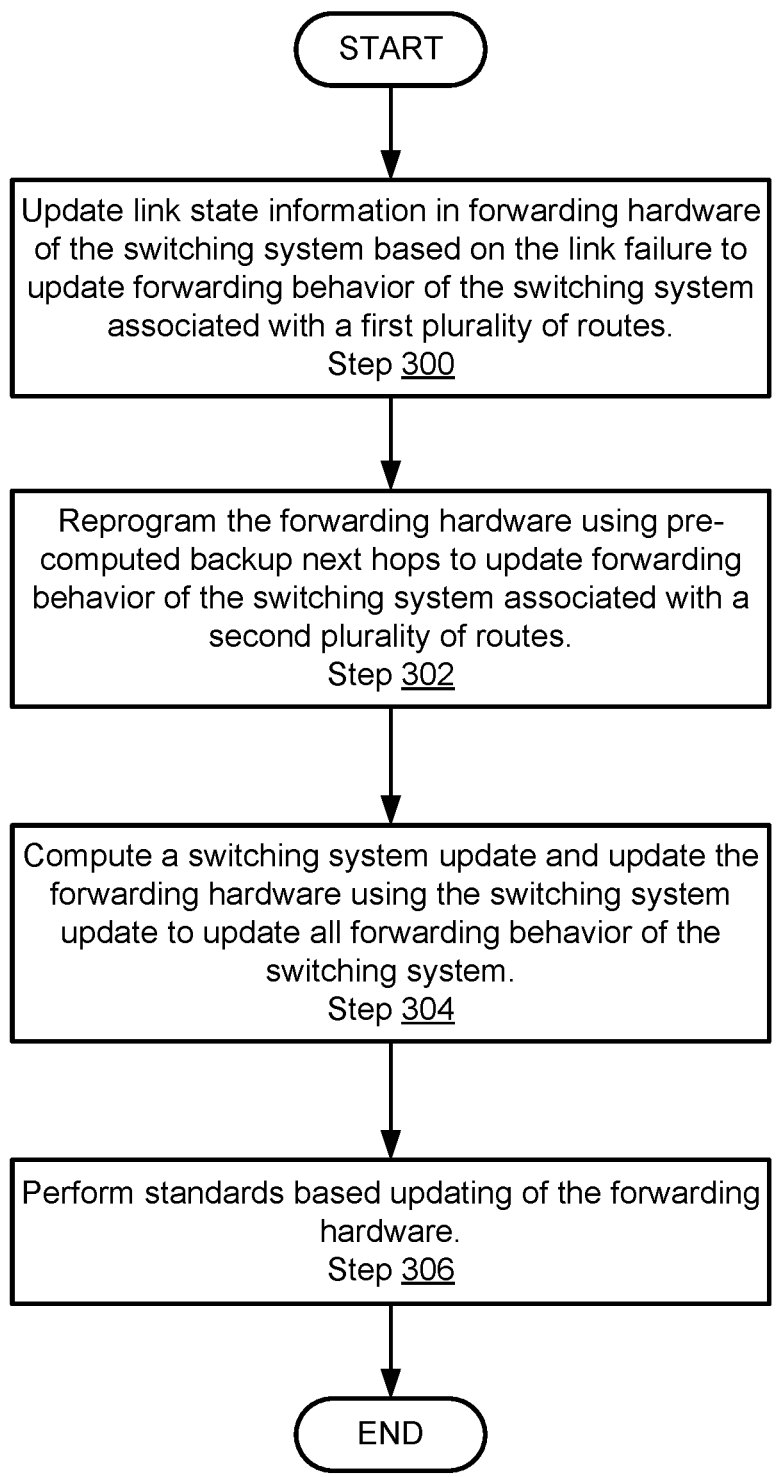
FIG. 3 shows a flowchart of a method of performing a multi-tiered failover to update packet forwarding behavior when responding to a link failure in accordance with one or more embodiments disclosed herein.
Figure 4:
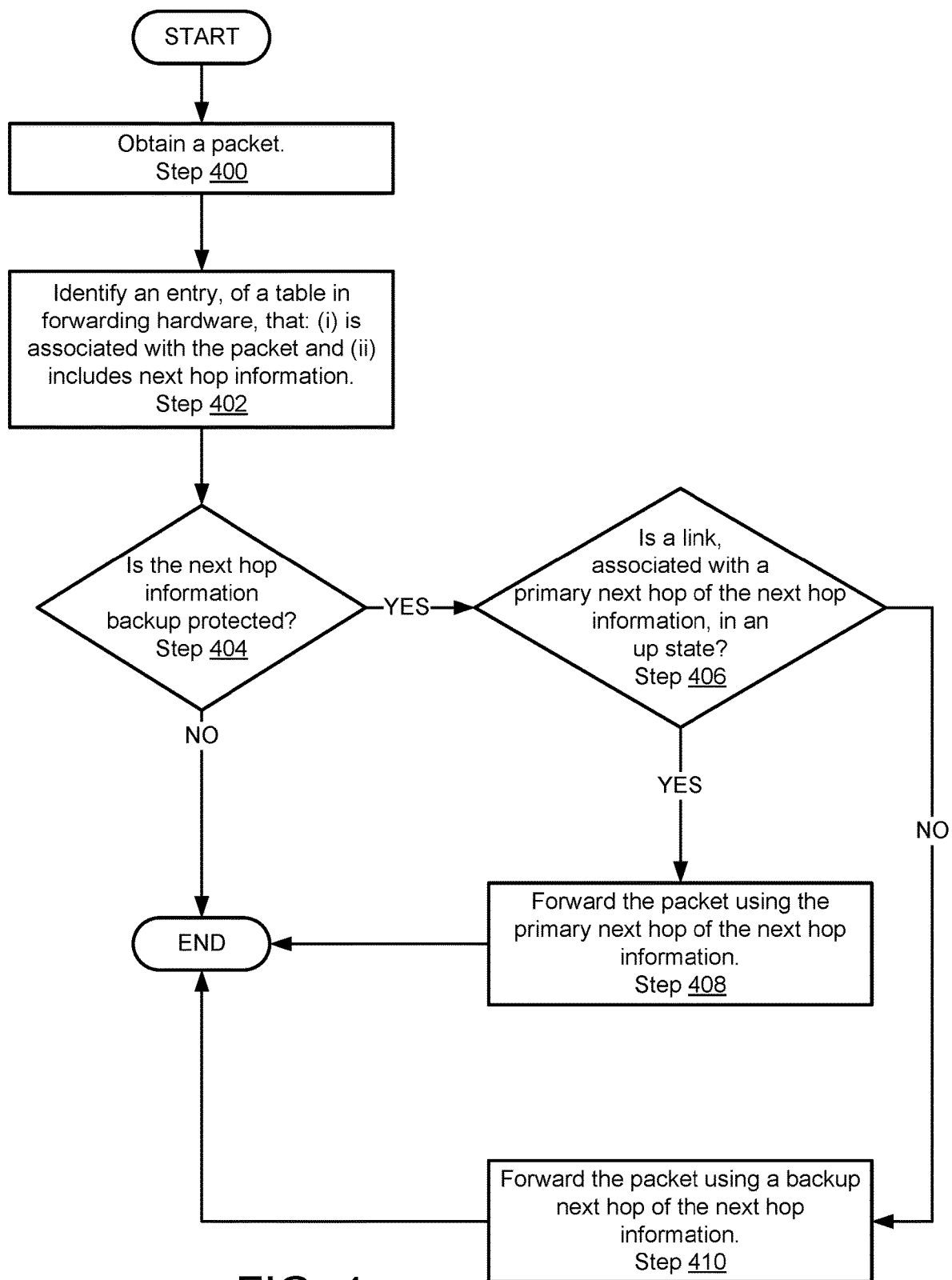
FIG. 4 shows a flowchart of a method of forwarding packets in accordance with one or more embodiments disclosed herein.

Following the description of the data structures, a description of methods that may be performed by components of the system of FIG. 1.1 is provided with respect to FIGS. 2-4. Lastly, a description of a computing device that may be used to implement the system of FIG. 1.1 is provided with respect to FIG. 5.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

FIG. 1.1 shows a diagram of an example system in accordance with one or more embodiments described herein. The system may include clients (e.g., 10, 12) that utilize services provided by network (20). The services provided by the network (20) may include, for example, network forwarding services for packets transmitted by clients (e.g., 10, 12). By forwarding packets (e.g., by providing packet forwarding services), network (20) may enable clients (e.g., 10, 12) to communicate with other devices.

To forward packets, network (20) may include network devices (22). Network devices (22) may be physical devices operably connected to any number of other devices. The network devices (22) may include functionality to (i) forward packets, (ii) obtain information regarding the network environment in which network devices (22) reside, and (iii) use the obtained information regarding the network environment to decide how to forward the packets. Network devices (22) may include any number of network devices and other types of devices. Network (20) is illustrated in FIG. 1.1 as including a specific number and arrangement of network devices for explanatory purposes only. In FIG. 1.1, operable connections are illustrated using lines terminated in arrows.

The arrangement of network device (22) in FIG. 1.1 may enable client A (10) to send packets to client B (12). For example, client A (10) may send a packet destined for client B (12) to network device A (24). Network device A (24) may, based on its understanding of the network environment (e.g., it being connected to both network device B (26) and network device (C) (28), and these network devices being connected to client B (12)) and the control information included in the packet, determine that the packet should be forwarded to network device B (26). In turn, network device B (26) may forward the packet to client B (12).

If the operable connection between network device B (26) and client B (12) were to fail, network device B (26) may be unable to continue to forward packets destined to client B (12) using the failed operable connection. However, because its packet processors are programmed to forward packets using the failed operable connection, it may continue to do so until its packet processors are modified (e.g., by reprogramming them). Forwarding the packets using the failed link may cause the packets to be lost. By modifying its packet processors, the forwarding behavior of network device B (26) may be updated to, for example, forward packets destined to client B (12) to network device C (28). Consequently, the packets may reach their desired destination rather than being lost.

Embodiments disclosed herein may provide network devices that more quickly respond to changes in network topology. Specifically, the network devices may modify the operation of their network processors using a multi-tiered approach. The multi-tiered approach may include the use of multiple techniques for modifying the operation of network processors. The ordering and structuring of the multiple techniques may reduce the time required to update the forwarding behavior of the network device.

By reducing the time required to update the forwarding behavior of the network device, the quantity of packets lost (or otherwise forwarded in an undesirable manner) due to forwarding of packets based on stale information may be reduced. For example, updating the forwarding behavior of the network device may take a finite duration of time. Consequently, after a network device identifies a change in a network environment, the network device may continue to forward packets without consideration for the change in the network environment until the forwarding behavior of the network device is updated to reflect the change in the network environment. Accordingly, during the finite duration of time required to update the forwarding behavior of the network device, the network device may forward packets in an undesirable manner (e.g., not in accordance with the network topology after it has been changed). By reducing the duration of the finite duration of time, the amount of undesirable forwarding behavior by the network device may be reduced.

Any of the components of FIG. 1.1 may be operably connected by any combination and/or number of wired and/or wireless connections.

As discussed above, the system of FIG. 1.1 may include network devices (e.g., 24, 26, 28) that may provide packet forwarding services. Any of the devices of FIG. 1.1 may be implemented using computing devices. The computing devices may include, for example, mobile phones, tablet computers, laptop computers, desktop computers, servers, switches, and/or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing devices to perform the functions described in this application and/or all, or a portion, of the methods illustrated in FIGS. 2-4. The devices of FIG. 1.1 may be implemented using other types of computing devices without departing from the embodiments disclosed herein. For additional details regarding computing devices, refer to FIG. 5.

The devices of FIG. 1.1 may be implemented using logical devices without departing from the embodiments disclosed herein. For example, the devices of FIG. 1.1 may be implemented using virtual machines (or other types of logical entities) that utilize computing resources (e.g., provided by hardware devices) of any number of physical computing devices to provide their respective functionalities. Thus, a logical entity may be an entity that, for example, shares various hardware devices when providing its functionality. The devices of FIG. 1.1 may be implemented using other types of logical devices without departing from the embodiments disclosed herein.

In one or more embodiments disclosed herein, the network devices are implemented as switching devices such as switches or multilevel switches. A switching device may be a device that is adapted to facilitate network communications. A switching device may include a computing device.

While the system of FIG. 1.1 has been illustrated and described as including a limited number of specific components, a system in accordance with embodiments disclosed herein may include additional, fewer, and/or different components than those illustrated and described.

To further clarify aspects of network devices, a diagram of network device (100) is provided in FIG. 1.2. Any of the network devices of FIG. 1.1 may be similar to network device (100) illustrated in FIG. 1.2.

FIG. 1.2 shows a diagram of network device (100) in accordance with one or more embodiments described herein. Network device (100) may facilitate network communications. To do so, network device (100) may provide any number of functionalities, including packet forwarding functionality. Packet forwarding functionality may include (i) programming hardware devices (e.g., packet processors) which may be used to forward packets, (ii) obtaining information regarding the network environment in which network device (100) resides and through which packets may traverse, and (iii) forwarding packets using the hardware devices.

To provide packet forwarding functionality, network device (100) may include ports (102), switching system (106) that switches packets between ports (102), switching system manager (108) that manages the operation of switching system (106), and/or data structures stored in storage (110) maintained by switching system manager (108). Each of these components of network device (100) is discussed below.

Ports (102) may facilitate obtaining of packets from other devices. For example, ports (102) may be adapted to operably connect to other devices (e.g., may receive cabling to another device). Ports (102) may obtain packets from other devices via the operable connections. The ports (102) may be associated with corresponding communication endpoints.

Ports (102) may also facilitate providing of packets to other devices. The ports (102) may provide the packets to other devices via the operable connections facilitated by the ports (102).

Switching system (106) may forward packets obtained via the ports (102) to other devices via the ports (102). For example, switching system (106) may direct packets received via one of ports (102) towards another of ports (102). Each of these ports may be operably connected to other devices. Consequently, switching the packets between these ports may cause the packets to be transmitted from a first device to a second device operably connected by the ports. Switching system (106) may selectively direct (e.g., switch) the packets in a manner that facilitates controlling the flow of packets across the network illustrated in FIG. 1.1.

For example, if a packet is transmitted by client A (10, FIG. 1.1) towards client B (12, FIG. 1.1), there may be multiple paths that the packet may take through network devices (22, FIG. 1.1) to reach client B (12). A switching system of any of network devices (22, FIG. 1.1) may be programmed to, for example, direct the packet toward client B (12) using an efficient path (e.g., lower latency), direct the packet toward client B (12) using a less used path to distribute packets across the network devices of network (20, FIG. 1.1), and/or for other purposes.

Switching system (106) may be programmable. How switching system (106) is programmed may determine how network device (100) switches and/or forwards packets. For example, switching system (106) may receive data and make decisions regarding how to forward packets based on the data, the packets, and/or one or more algorithms for making switching decisions. For additional details regarding switching system (106), refer to FIG. 1.3.

Switching system manager (108) may manage the operation of switching system (106). Switching system manager (108) may manage the operation of switching system (106) by (i) updating, (ii) programing, and/or (iii) reprogramming the packet processors (or other devices that make packet forwarding decisions) of switching system (106). By doing so, switching system manager (108) may change the forwarding behavior of network device (100) by changing out of which ports received packets are sent (e.g., after an update, programming, reprogramming).

To manage the operation of switching system (106), switching system manager (108) may (i) monitor the operation of switching system (106), (ii) obtain information regarding the network environment in which network device (100) resides, and/or (iii) determine how to modify the operation of switching system (106) (e.g., by reprogramming/programming packet processors) based on the information obtained by switching system manager (108).

The process of determining how to modify the operation of switching system (106) may be time consuming. Consequently, switching system manager (108) may program the network processors (or other devices tasked with making packet switching decisions) to automatically and/or quickly respond to changes in network topology (e.g., respond to changes in network topology without needing to be reprogrammed) and may pre-compute how to modify the operation of switching system (106) in anticipation of a change in network topology (e.g., enable network processors to be reprogrammed without having to compute the changes at the time of the change in network topology). By pre-programming the packet processors and pre-computing modifications of the operation of switching system (106) in anticipation of a change in network topology, the time required to modify the forwarding behavior of network device (100) may be reduced.

In one or more embodiments disclosed herein, switching system manager (108) is implemented using a hardware device including circuitry. Switching system manager (108) may include, for example, a digital signal processor, a field programmable gate array, and/or an application specific integrated circuit. The circuitry of the hardware devices may be adapted to provide the functionality of switching system manager (108). Switching system manager (108) may be implemented using other types of hardware devices without departing from embodiments disclosed herein.

In one or more embodiments disclosed herein, switching system manager (108) is implemented using computing code stored on a persistent storage that when executed by a processor causes the processor to perform the functionality of switching system manager (108). The processor may be a hardware processor including circuitry such as, for example, a central processing unit or a microcontroller. The processor may be other types of hardware devices for processing digital information without departing from the embodiments disclosed herein.

Switching system manager (108) may perform all, or a portion, of the methods illustrated in FIGS. 2-4 as part of providing its functionality.

When performing its functionality, switching system manager (108) may utilize data structures stored in storage (110).

In one or more embodiments disclosed herein, storage (110) is implemented using devices that provide data storage services (e.g., storing data and providing copies of previously stored data). The devices that provide data storage services may include hardware devices and/or logical devices. For example, storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, storage (110) may include a memory device (e.g., a dual in line memory device) in which data is stored and from which copies of previously stored data are provided. In another example, storage (110) may include a persistent storage device (e.g., a solid state disk drive) in which data is stored and from which copies of previously stored data is provided. In a still further example, storage (110) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

Storage (110) may store data structures including the information discussed above. For example, storage (110) may store switching system repository (112), pre-computed backup next hops (114), and computed update (116). Each of these data structures is discussed below.

Switching system repository (112) may be implemented using one or more data structures that store information regarding the operation of switching system (106) and/or information regarding the network environment in which network device (100) resides. The stored information may be used by switching system manager (108) to modify the operation of switching system (106).

For example, switching system repository (112) may include information regarding the network environment in which network device (100) is disposed, information regarding how switching system (106) is programmed, and/or other types of information. The information included in switching system repository (112) may include any type and quantity of information, the information may be obtained and/or be updated by switching system manager (108) and/or other entities, and may include additional, different, and/or less information without departing from embodiments disclosed herein.

Pre-computed backup next hops (114) may be implemented using one or more data structures that store information that may be used to program and/or reprogram switching system (106). Specifically, pre-computed backup next hops (114) may include information that should be used to switch packets in the event that one of links (105) to other devices fails.

For example, returning to FIG. 1.1, consider a scenario in which network device A (24) is programmed to forward packets from client A (10) toward client B (12) through network device C (28). In this scenario, if the link between network device A (24) and network device C (28) fails, then network device A (24) may be unable to forward packets toward client B (12) via network device C (28). Prior to failure of the aforementioned link failure, a backup next hop may be computed to determine how to best forward packets if the aforementioned link fails. In this example, the backup next hop may include information that may be used to program the switching system of network device A (24) to forward packets destined for client B (12) through network device B (26).

Pre-computed backup next hops (114) may be generated when an overall update to the programming of switching system (106) is generated. Pre-computed backup next hops (114) may be used to update the switching behavior of switching system (106) without entirely reprogramming switching system (106). Consequently, the switching behavior of switching system (106) may be rapidly updated in response to changes in network topology using the information included in pre-computed backup next hops (114).

For example, to determine how to switch packets, switching system manager (108) may perform one or more algorithms (e.g., a best path selection algorithm, network traffic distribution/balancing algorithm, etc.). The algorithms may take, as input, information included in switching system repository (112) (e.g., network topology/connectivity information). The output of the algorithms may be information that may be used to program switching system (106) to cause packets to be switched by switching system (106) in a desirable manner (e.g., in accordance with a predetermined method for forwarding packets that an administrator or other person may have selected). Additionally, the output of the algorithms may include information about how switching system (106) should be programmed in the event of a different network state, such as a failure of one or more of links (105). The additional information may be changes, for example, to next hops for packets received by switching system (106).

In one or more embodiments disclosed herein, next hops include information regarding though which ports packets should be forwarded after being received by network device (100). Backup next hops may specify similar information but under hypothetical conditions. The hypothetical condition may be, for example, a failure of one or more of links (105). In other words, a change in topology of the network environment in which network device (100) resides. For additional details regarding use of backup next hops, refer to FIGS. 1.4-1.7.

The information included in pre-computed backup next hops (114) may become stale over time. For example, changes in the operation of network device (100), changes in the network topology, and/or other factors that may influence how switching system (106) should be programmed may change over time. Consequently, the information included in pre-computed backup next hops (114) may not always be up to date because switching system manager (108) may not continuously perform the algorithms used to generate these data structures. However, the information included in pre-computed backup next hops (114) may still be useful because, as will be discussed in greater detail below, it may be used to efficiently change the packet switching behavior of switching system (106) in response to changes in network topology.

Computed update (116) may be implemented using one or more data structures that store information that may be used to program switching system (106). As noted above, switching system manager (108) may perform one or more algorithms to obtain information that may be used to program all elements of switching system (106) based on the current information obtained by network device (100) (e.g., the network topology/other information in switching system repository (112)). As will be discussed with respect to FIGS. 1.4-1.7, switching system (106) may be programmed with large amounts of information.

Computed update (116) may be a data structure generated in response to a link failure or other type of change in network topology, type of packets being received by network device (100), or other condition that necessitates a change in the programming of switching system (106) (e.g., switching system manager (108) may actively monitor conditions and automatically initiate computation and implementation of updates in response to changing conditions). Due to the complexity of the algorithms used to compute computed update (116), it may take significant time to generate it (and other information such as pre-computed backup next hops (114)). Consequently, if only computed update (116) is used to modify the packet switching performed by switching system (106), significant numbers of packets may be switched in an undesirable manner.

For additional details regarding data structures that may be stored in switching system repository (112), refer to FIGS. 1.4-1.5.

While network device (100) of FIG. 1.2 has been illustrated as including a limited number of specific components, a network device in accordance with embodiments disclosed herein may include additional, fewer, and/or different components.

As discussed above, network device (100) may include a switching system. FIG. 1.3 shows a diagram of switching system (106) in accordance with one or more embodiments disclosed herein. Switching system (106) may facilitate switching of packets between any numbers of ports (102).

Switching packets in accordance with one or more embodiments disclosed herein may be a process of directing packets received on a first port to a second port of network device (100). The first port may be operably connected to a first device and the second port may be operably connected to a second device. Consequently, packets that are switched may be received from the first device and transmitted toward the second device.

The packets may be switched based on, for example, the destinations of the packets and the programming of programmed forwarding hardware (132) of packet processors (e.g., 130A, 130N). For example, when a packet is received, control information of the packet may be used to identify how to switch the packet. One or more algorithms implemented by the packet processors (130A, 130N) may be used to match or otherwise link the control information to information that has been programmed into the programmed forwarding hardware (132) of the packet processors. The packets may be switched based on additional and/or different information without departing from embodiments disclosed herein.

To perform switching, packet processors (130A, 130N) may obtain packets from ports (102) (e.g., sent by other devices operably connected to the ports via links (105A, 105L, 105N, 105Q, 105S), use their programmed forwarding hardware (132) to determine out of which port to send each respective packet, and direct each of the respective packets towards the determined ports. Consequently, the packets may be sent to other devices via links operably connected to the determined ports.

For example, a packet may be received from another device via link A (105A). Link A (105A) may be connected to one of the ports (102). That port may be connected to packet processor A (130A). Packet processor A (130A) may use control information of the packet and its programmed forwarding hardware (e.g., 132) to ascertain that the packet should be sent along link S (105S) to another device. To do so, the forwarding hardware (132) may specify out of which of the ports (102) the packet should be sent. Packet processor A (130A) may then send the packet out of that port so that the packet traverses link S (105S) towards the other device.

The determination made by packet processor A (130A) is based on the programming of its programmed forwarding hardware (e.g., 132). Consequently, changing the programming of programmed forwarding hardware (132) or updating the operation of the packet processors may update the forwarding behavior of network device (100, FIG. 1.2).

To enable the packet processors (130A, 130N) to quickly respond to changes in network topology, programmed forwarding hardware (132) may include information that may be used to update packet switching decisions based on changes in link states (e.g., in response to link failures). For example, if a link fails, programmed forwarding hardware (132) may already include information that specifies how packets should be forwarded after failure of that link. Consequently, rather than needing to reprogram programmed forwarding hardware (132) to reflect a link failure, packet processors (130A, 130N) may change their packet switching in response to a link failure by simply being made aware of the change in the link state. Once made aware of the change in the link state, the programmed forwarding hardware (132) may utilize pre-programmed information to make packet switching decision thereby changing the packet switching behavior of the switching system (106). For additional details regarding the programming of programmed forwarding hardware (132), refer to FIGS. 1.4-1.7.

Packet processors (130A, 130N) may be implemented using one or more physical devices. A physical device (e.g., a chip, die, etc.) may include circuitry adapted to perform the functionality of packet processors (130A, 130N). In some embodiments disclosed herein, the circuitry may include programmable portions (e.g., programmed forwarding hardware) that may be adapted to execute computing instructions (e.g., computer code) that cause the programmable portions of the circuitry to perform all, or a portion, of the functionality of packet processors (130A, 130N).

For example, programmed forwarding hardware (132) may implement a packet processing pipeline that enables rapid switching determinations to be made. The packet processing pipeline may enable control information of the packets to be matched to information included in the programmed forwarding hardware (132) to determine how to switch the packets. The programming pipeline may, for example, implement predetermined algorithms for making forwarding decisions that are adapted based on the information programmed into programmed forwarding hardware (132). Consequently, the forwarding decisions made by the forwarding pipeline may be adapted to meet various network topologies.

The switching system (106) may include any number of packet processors. Each of the packet processors may process packets obtained from any number of ports.

While packet processors (130A, 130N) have been illustrated as including a limited number of specific components, a packet processor in accordance with embodiments disclosed herein may include additional, fewer, and/or different components than those illustrated in FIG. 1.3.

While switching system (106) of FIG. 1.3 has been illustrated as including a limited number of specific components, a switching system may include additional, fewer, and/or different components without departing from embodiments disclosed herein.

As discussed above, packet processors may switch packets based on the programming of programmed forwarding hardware (132). FIG. 1.4 shows a diagram of programmed forwarding hardware (132) in accordance with one or more embodiments disclosed herein.

As discussed above, programmed forwarding hardware (132) may perform one or more algorithms to determine how to switch packets. The algorithms may utilize information that is programmed into programmed forwarding hardware (132) to make those decisions.

For example, programmed forwarding hardware (132) may include programmable lookup tables (150). The algorithms employed by programmed forwarding hardware (132) may operate on entries of the lookup tables (150) when deciding how to switch packets. The lookup tables (150) may include any number of entries. Each of the entries may include any number of fields. The fields may include any number of sub-fields.

For example, the algorithms employed by programmed forwarding hardware (132) may first match control information (and/or encapsulation headers or other types of control information added to the packet) of a packet to information in a table of the lookup tables to classify a packet. The classification may be stored in a field of an entry of the table. The entry of the table may also include information that may be matched against the control information (and/or other types of information that may be appended to the packet for control purposes such as labels, headers, etc.). The classification may be, for example, a traffic equivalency class that defines a level of service that packets classified in each equivalency class are to be provided.

The classification may then be matched to information included in other tables to identify, for example, out of which port to send the packet, encapsulation information to add to the packet, and/or other steps of switching a packet.

Lookup tables (150) may include any number of tables used by the algorithms employed by programmed forwarding hardware (132) to determine how to switch and forward packets. In FIG. 1.4, only a limited number of the tables used by programmed forwarding hardware (132) are illustrated for brevity. These lookup tables (150) may include, for example, forwarding equivalency class table (160) and link state table (170). Each of these tables is discussed below.

Forwarding equivalency class table (160) may include information used to determine how to forward packets. The information may include next hops usable to forward packets.

The information may also include backup next hops that are to be used, for switching purposes, upon the occurrence of a failure of a link associated with another next hop. Consequently, forwarding equivalency class table (160) may include information that may be used to switch packets based on two different network states (e.g., one in which a link is in an up state—supporting an operable connection—and one in which a link is failed—does not support an operable connection). For additional details regarding forwarding equivalency class table (160), refer to FIGS. 1.5-1.6.

Link state table (170) may include information regarding the state of any number of links. For example, when a link fails, link state table (170) may be updated to reflect the new state of the link.

Link state table (170) and forwarding equivalency class table (160) may be maintained by switching system manager (108).

Turning to FIG. 1.5, FIG. 1.5 shows a diagram of forwarding equivalency class table (160) in accordance with embodiments disclosed herein.

Forwarding equivalency class table (160) may be implemented as a table that includes any number of entries. Some of the entries may be next hop backup protected entries (162) and others may be next hop backup unprotected entries (166).

Next hop backup protected entries (162) may be entries (e.g., 164A, 164N) that specify how to switch a packet upon the occurrence of a link failure. All of the entries of forwarding equivalency class table (160) may specify how to switch packets that are matched to the respective entities. The entries may do so by specifying out of which port (e.g., part of or associated with a next hop) packets matched to each respective entry are to be sent. Consequently, the packets may be sent across links corresponding to the ports out of which the packets are sent. However, if the link associated with a port fails, packets matched to the entries may not be sent out due to the failed link.

Next hop backup protected entries (162) may be entries that include a backup next hop that is to be used to switch packets in the event of a link failure. Thus, in the event of a link failure, packets matched to next hop backup protected entries (162) may continue to be switched and sent by network device (100) using the backup next hop information included in the next hop backup protected entries (162). For an example of a next hop backup protected entry, refer to FIG. 1.5.

In contrast, next hop backup unprotected entries (166) may not include a backup next hop. Consequently, packets matched to backup unprotected entries may not continue to be sent and switched after a link failure until the next hop backup unprotected entry is reprogrammed with different next hop information.

The next hop backup unprotected entries (166) may be included in forwarding equivalency class table (160) because the manner in which they were programmed does not support backup next hops. For example, the content of any of the entries of forwarding equivalency class table (160) may be programmed in a number of different manners. Each manner of programming the entries may confer different benefits for packet switching and forwarding purposes.

Only a portion of the manners of programming the entries may allow for backup next hops due to limitations in the algorithms employed by the forwarding hardware. Consequently, when forwarding equivalency class table (160) is programmed, only some of the entries may be backup protected.

Turning to FIG. 1.6, FIG. 1.6 shows a diagram of example next hop backup protected entry (180). Any of the backup protected next hop entries of FIG. 1.6 may be similar to example next hop backup protected entry (180).

Example next hop backup protected entry (180) may include an identifier (182), a protection status identifier (184), and next hop information (186).

Identifier (182) may be used to match packets to the example next hop backup protected entry (180). For example, identifier (182) may be a forwarding equivalency class identifier. Consequently, packets that are classified based on forwarding equivalency class may be matched against identifier (182) to determine if next hop information (186) should be used to switch the packets.

Protection status identifier (184) may specify whether the entry is a backup protected entry. Additionally, protection status identifier (184) may specify an entry of link state table that includes information regarding a link associated with one of the next hops of next hop information (186). The entry of the link state table may be used to determine the state of the link associated with one of the next hops of next hop information (186).

Next hop information (186) may specify how a packet is to be switched. The next hop information (186) may specify, in part, out of which port to send packets matched to example next hop backup protected entry (180).

Next hop information (186) may include primary next hop (186A) and backup next hop (186B). Primary next hop (186A) may specify, in part, out of which port to send a packet while the link specified by the protection status identifier (184) is up. Primary next hop (186A) may be based on a computed update (e.g., 116).

Backup next hop (186B) may specify, in part, out of which port to send a packet while the link specified by the protection status identifier (184) is down (e.g., inoperable). Backup next hop (186B) may be based on a pre-computed backup next hop (e.g., 114). Thus, only a portion of the pre-computed backup next hops (e.g., 114) may be programmed into the forwarding hardware.

Any number of backup protected forwarding equivalency class may include a primary next hop that specifies the same port out of which packets matched to the entries are to be sent. Consequently, any number of entries may reference a similar entry of the link state table.

Turning to FIG. 1.7, FIG. 1.7 shows a diagram of link state table (170) in accordance with one or more embodiments of the disclosure. Link state table (170) includes information specifying the status of any number of links.

Link state table (170) may include any number of entries (172, 174). Entries (172, 174) of link state table (170) may each specify a corresponding link identifier (172A) and link status (172B). Link identifier (172A) may be an identifier of the link associated with the entry.

Entries of forwarding equivalency class table (160) that are next hop backed up may reference an entry of link state table (170). For example, entries of forward equivalency class table (160) that are next hop backed up may include a copy of a link identifier corresponding to the entry of link state table (170) that specifies link status (172B) of the link associated with primary next hop of the entry of the forward equivalency class table (160). Consequently, when link status (172B) is modified, any number of entries of forwarding equivalency class table (160) may determine that a backup next hop, rather than a primary next hop, should be used for packet forwarding purposes.

While the data structures illustrated in FIGS. 1.4-1.7 have been illustrated as including a limited amount of specific information, any of the data structures may include additional, different, and/or less information without departing from embodiments disclosed herein.

In one or more embodiments disclosed herein, the storage of the programmed forwarding hardware (132) is implemented using devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, the storage may include a memory device (e.g., a dual in line memory device) in which data is stored and from which copies of previously stored data are provided. In another example, the storage may include a persistent storage device (e.g., a solid state disk drive) in which data is stored and from which copies of previously stored data is provided. In a still further example, the storage may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The data structures stored in storage may include, for example, lookup tables (150). The lookup tables (150) may include any number of tables including, for example, forwarding equivalency class table (160) and link state table (170). Each of these data structures is discussed below.

Forwarding equivalency class table (160) may be one or more data structure that includes information that may be used to determine how to switch packets. For example, forwarding equivalency class table (160) may specify out of which ports packets having a particular forwarding equivalency class are to be forwarded. Any number of entries of forwarding equivalency class table (160) may use, in part, the statuses of links specified by link state table (170) to define how packets should be forwarded. Consequently, changes in link state table entries may automatically cause forwarding equivalency class table entries to be used differently when packet switching decisions are made. For additional details regarding forwarding equivalency class table (160), refer to FIG. 1.5.

Link state table (170) may be one or more data structures that include information that may be used to determine the state of each link associated with the ports out of which packets may be sent. For example, link state table (170) may specify the operational state of the links associated with the respective ports. The link state table (170) may be used to modify how packet processors switch packets without reprogramming the packet processors. For example, any number of forwarding equivalency class table (160) entries may reference link state table (170) entries. Consequently, when the content of a link state table entry changes, the manner in which the information in a forwarding equivalency class table entry is used to switch packets may change. For additional details regarding link state table (170), refer to FIG. 1.7.

While programmed forwarding hardware (132) has been illustrated and described as including lookup table (150), programmed forwarding hardware in accordance with embodiments disclosed herein may include different types of data structures that include additional, different, and/or less information.

As discussed above, a network device may automatically perform a multi-tiered nexthop failover in response to a link failure while forwarding packets. FIGS. 2-3 show diagrams of methods that may be performed by a network device in accordance with one or more embodiment disclosed herein when forwarding packets while performing a multi-tiered nexthop failover.

FIG. 2 shows a flowchart describing a method for processing packets in accordance with one or more embodiments disclosed herein. The method may be performed by, for example, a network device (e.g., 100, FIG. 1.2). Other entities may perform the method of FIG. 2 without departing from embodiments disclosed herein.

While the various steps in the flowchart shown in FIG. 2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In Step 200, a failure of a link associated with a network device and an adjacent device is identified. The failure of the link may be identified using any method (e.g., network discovery).

The adjacent device may be directly connected to the network device via a link. The link may operably connect a port of the network device to a port of the adjacent device. The adjacent device may be a next hop (e.g., a device to which a packet will be sent to next as it is routed toward a destination) for one or more packets that may be received by the network device.

In step 202, a multi-tiered nexthop failover of a switching system of the network device is performed based on the failure of the link to obtain an updated switching system that does not forward packets using the link. Additional detail about the multi-tiered nexthop failover is described in FIG. 3.

In step 204, packets are forwarded using the updated switching system. Step 204 may be performed in parallel with step 202. As the switching system is updated in step 202, packets may continue to be switched and sent using the next hops. Consequently, some packets may be sent using next hop information that is stale because they are switched and sent prior to completion of the multi-tiered next hop failover. Additional details about step 204 are described in FIG. 4.

However, due to the rapid speed at which some of the portions of the multi-tiered next hop failover are performed, many of the packets may be switched and sent using next hop information that is up to date. For example, updating the link state table may only include modifying a single entry of a table, which may be completed very quickly. Consequently, all of the entries of the forwarding equivalency class table that reference the updated entry of the link state table may be up to date because the backup next hops of the forwarding equivalency class table entries, rather than the primary entries, are used to determine how to switch the packets.

Similarly, by using pre-computed backup next hops to update next hop information, rather than computing new next hops in response to a link state failure, the entries of the forwarding equivalency class table impacted by the link failure may be reprogrammed more quickly.

The method may end following step 204.

Using the method illustrated in FIG. 2, a network device may respond to a change in network topology in a manner that is less likely to result in undesirable packet switching. For example, by performing a multi-tier next hop failover process, the switching behavior of packet processors may be rapidly updated thereby reducing undesirable packet switching by the network device.

Turning to FIG. 3, FIG. 3 shows a flowchart describing a method for performing a multi-tiered next hop failover in accordance with one or more embodiments disclosed herein. The method may be performed by, for example, a network device (e.g., 100, FIG. 1.2). Other entities may perform the method of FIG. 3 without departing from embodiments disclosed herein.

While the various steps in the flowchart shown in FIG. 3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 300, link state information in forwarding hardware of the switching system is updated based on the link failure to update forwarding behavior of the switching system associated with a first plurality of routes. The link state information may be updated by updating a corresponding entry of a link state table in the forwarding hardware. The link state information may be updated by specifying that the link is down in the entry of the link state table.

As discussed above, any number of entries of a forwarding equivalency class table may reference an entry of a link state table. By modifying the entry of the link state table, the packet processor may change its forwarding behavior when packets are matched to these entries of the forwarding equivalency class table. Specifically, by indicating that the state of the link is down in the link state table, the packet processor may use the backup next hop included in the entries of the forwarding equivalency class table that reference the updated entry of the link state table. Consequently, the backup next hop, rather than the primary next hop, of the entries of the forwarding equivalency class table that reference the updated entry of the link state table may be used to determine out of which port to send packets that are matched to the entries of the forwarding equivalency class table that reference the updated entry of the link state table.

Thus, the forwarding behavior of the network device for packets associated with routes that match to the entries of the forwarding equivalency class table that reference the updated entry of the link state table may be rapidly updated. For example, only a single field of a single entry of the link state table may be changed to implement this update to the forwarding behavior of the network devices. Consequently, the update may occur very quickly.

However, as discussed with respect to FIG. 1.5, not all of the entries of the forwarding equivalency class table may reference entries of the link state table. For example, some of the entries are next hop backup unprotected entries. Thus, when the link state table is updated, some of the entries of the forwarding equivalency class table may still include information that may cause packets to be switched in a manner that results in them being attempted to be sent via the failed link. Consequently, the packet forwarding behavior of the network device may be improved upon the completion of step 300 but may still include some undesirable packet forwarding behavior.

In one or more embodiments disclosed herein, all of the first plurality of routes are associated with backup next hop protected entries of the forwarding equivalency class table. For example, all of the routes of the first plurality of routes may match to forwarding equivalency class table entries that are backup next hop protected entries.

By performing step 300, a number of primary next hops programmed in forwarding hardware may be deactivated and a similar number of backup next hops may be activated. In other words, the primary next hops may not be used to make packet switching decisions while the backup next hops, which were not used prior to the link failure, are used for making packet switching decisions.

In step 302, the forwarding hardware of the switching system is reprogrammed using pre-computed backup next hops to update forwarding behavior of the switching system associated with a second plurality of routes. This process of reprogramming may be referred to pre-compute programming of the switching system. To reprogram the forwarding hardware using the pre-computed backup next hops, any number of entries of a forwarding equivalency class table may be updated based on the pre-computed backup next hops.

For example, the pre-computed backup next hops may include next hops that are to be used for each forwarding equivalency class table entry upon the occurrence of a failure of the link (i.e., the link that was identified as having failed in 200 of FIG. 2). The forwarding equivalency class tables may be reprogrammed by updating them based on the pre-computed backup next hops. For example, the next hop information included in each of the forwarding equivalency class table entries may be updated to match that specified by the pre-computed backup next hops.

In comparison to the process of step 300, the process of step 302 may require more time to be completed. For example, the forwarding equivalency class table may include a large number of entries and each of the entries may need to be updated to update the switching and forwarding behavior of the network device.

However, because not all of the entries of the forwarding equivalency class table are next hop backup protected entries, some of the entries may need to be reprogrammed to update the packet switching behavior of the packet processors to avoid directing packets to the failed link.

By reprogramming the forwarding hardware using the pre-computed backup next hops, the reprogramming may be initiated immediately upon identifying that the link has failed. In other words, new next hops do not need to be computed after identifying that the link has failed.

In one or more embodiments disclosed herein, the second plurality of routes are associated with both the backup next hop protected entries of the forwarding equivalency class table and backup next hop unprotected entries of the forwarding equivalency class table. Some of the routes of the second plurality of routes may match to forwarding equivalency class table entries that are backup next hop protected entries and other routes of the second plurality of routes may match to forwarding equivalency class table entries that are backup next hop unprotected entries. For example, reprogramming the forwarding hardware using the pre-computed backup next hops may reprogram all of the entries of the forwarding equivalency class table. Consequently, all packets, regardless of route, may be matched to entries of the forwarding equivalency class table that have been updated. Thus, the second plurality of routes may include all of the first plurality of routes and additional routes.

In one or more embodiments disclosed herein, the second plurality of routes are associated with only backup next hop unprotected entries of the forwarding equivalency class table. For example, only entries of the forwarding equivalency class table that were not updated as part of step 300 may be reprogrammed in step 302. Thus, the second plurality of routes may be distinct from the first plurality of routes (e.g., include different routes than those in the first plurality of routes).

Because the pre-computed backup next hops are computed in advance of the link failure, the pre-computed backup next hops may be based on stale network state information. Consequently, when applied, the forwarding behavior of the network device may be updated to avoid directing packets toward the failed link but may cause some undesirable forwarding behavior. For example, the forwarding behavior may be less efficient because it is based on stale information (e.g., outdated information). Accordingly, the forwarding behavior of the network device after steps 300 and 302 may be improved, it may still include some undesirable features.

In step 304, a switching system update is obtained and the forwarding hardware of the switching system is updated using the switching system update to update all forwarding behavior associated with the switching system. This process may be referred to as second programming of the switching system. To obtain the switching system update, the switching system manager may perform any number of algorithms that result in the switching system update. For example, current network state information (and/or other types of information) in switching system repository (112, FIG. 1.2) may be utilized by the algorithms to obtain the switching system update (e.g., computed update (116, FIG. 1.2)).

The switching system update may specify how the entirety of the forwarding hardware of the packet processors is to be programmed. For example, the switching system update may specify new primary and backup next hops for next hop backup protected entries of forwarding equivalency class tables, new next hop information for backup next hop unprotected entries of forwarding equivalency class tables, programming for other look up tables, etc.

The forwarding hardware of the switching system may be updated using the switching system update by programming it to match the information included in the switching system update.

Additionally, when the algorithms used to obtain the switching system update are performed, next pre-computed backup next hops may be computed. The pre-computed backup next hops may be used to program the backup next hops of backup next hop protected entries. The pre-computed backup next hops may also be stored so that they are available for the next time step 302 is performed.

By performing the update in step 304, the information included in forwarding hardware may be updated to reflect the currently known information. Consequently, the resulting packet switching and forwarding behavior of the network device may be desirable. However, because complex algorithms need to be executed to obtain the switching system update, the switching system update may not be used to update the switching system until some time after a link failure has occurred. Consequently, in the absence of steps 300 and 302, significant undesirable packet switching and forwarding behavior may occur. By performing steps 300 and 302 concurrently or prior to step 304, at least a portion of the undesirable packet switching and forwarding behavior may be eliminated.

In step 306, standards based updating of the forwarding hardware is performed. The standards based updating of the forwarding hardware may include performing update algorithms associated with communication protocols implemented by the network device. For example, as network topology changes, the communication protocols implemented by the network device may specify that corresponding information used to make switching decisions is to be updated. Consequently, after the switching system is updated in step 304, it may continue to be updated as the network topology changes (and/or other factors that the algorithms associated with the communication protocols take into account when determining how information used to make switching decisions is to be updated).

The method may end following step 306.

Using the method shown in FIG. 3, the packet forwarding behavior of a network device may be efficiently updated in a manner that reduces the amount of undesirable packet switching and forwarding. For example, by implementing a number of different methods of updating the switching a forwarding behavior of packet processors that are each performed following a link failure, the amount of undesirable packet switching and forwarding behavior may be reduced.

Turning to FIG. 4, FIG. 4 shows a flowchart describing a method for forwarding packets in accordance with one or more embodiments disclosed herein. More specifically, FIG. 4 describes how the network device processes packets in Step 204; concurrently with (or after) process described in Step 202 (and FIG. 3) is performed. The method may be performed by, for example, a network device (e.g., 100, FIG. 1.2). Other entities may perform the method of FIG. 4 without departing from embodiments disclosed herein.

While the various steps in the flowchart shown in FIG. 4 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 400, a packet is obtained. The packet may be obtained by receiving via a first port.

In step 402, an entry of a table in forwarding hardware is identified that (i) is associated with the packet and (ii) includes next hop information. The entry may be a forwarding equivalency class table entry.

In step 404, it is determined whether the next hop information in the entry is backup protected. The determination may be made based on the information included in the entry. For example, the entry may include a bit that specifies whether the next hop information is backup protected.

If it is determined that the next hop information is backup protected, the method may proceed to step 406. If it is determined that the next hop information is not backup protected, the method may end.

In step 406, it is determined whether a link, associated with a primary next hop of the next hop information, is in an up state. The determination may be made based on information included in a link state table entry. The link state table entry may be associated with the entry identified in step 402. The link state table entry may specify whether the link is up or down.

If it is determined that the link is in an up state, the method may proceed to step 408. If it is determined that the link is not in an up state (e.g., a down state), the method may proceed to step 410.

In step 408, the packet is forwarded using the primary next hop of the next hop information. For example, the packet may be directed towards a port specified by or associated with (e.g., the primary next hop may reference another table that specifies the port and/or other information used to forward the packet) the primary next hop.

The method may end following step 408.

Returning to step 406, the method may proceed to step 410 following step 406 if it is determined that the link is not in an up state.

In step 410, the packet is forwarded using a backup next hop of the next hop information. For example, the packet may be directed towards a port specified by or associated with the backup next hop.

The method may end following step 410.

Using the method illustrated in FIG. 4, packets may be forwarded using backup next hop protected next hop entries that are easily updated to change forwarding behavior upon the occurrence of a link failure.

To further clarify embodiments disclosed herein, an example in accordance with embodiments is provided in FIGS. 5.1-5.2. FIGS. 5.1-5.2 show a system similar to that illustrated in FIG. 1.1. Operable connections between components of the system are illustrated using solid lines terminating in arrows. For the sake of brevity, only a limited number of components of the system of FIG. 1.1 is illustrated in FIGS. 5.1 and 5.2.

Example

Consider a scenario as illustrated in FIG. 5.1 in which two clients (500, 502) communicate with each other via a network that includes four network devices (e.g., 510, 512, 514, 516). In the topology shown in FIG. 5.1, first client (500) is connected to first network device (510). First network device (510) is connected to second network device (512) via first link (520). First network device (510) is connected to third network device (514) via second link (522). First network device (510) is connected to fourth network device (516) via third link (524). Each of second network device (512), third network device (514) and fourth network device (516) is connected to second client (502).

When operating, the network devices (e.g., 510, 512, 514, 516) obtain information regarding their network environment including, for example, the states of the links (e.g., 520, 522, 524) between first network device (510) and the other network devices (e.g., 512, 514, 516). Based on the obtained information, first network device (510) programs its switching system to switch packets.

When programming its switching system, first network device (510) programs a forwarding equivalency class table, a link state table, and other tables used by the switching system to decide how to switch packets. For example, the switch system may include a first table that matches control information included in packets to identifiers. The identifiers may be associated forwarding equivalency classes (e.g., thereby classifying the packets). Thus, the first table may be used to match packets to forwarding equivalency classes.

The forwarding equivalency class table may match forwarding equivalency classifications of packets to information usable to switch the packets. For example, consider Table 1 below which illustrates information included in an example forwarding equivalency class table of first network device (510). Table 1 may include information usable to switch packets received from first client (500) that are destined for second client (502). As noted above, first network device (510) may forward these packets via different paths (e.g., via second network device (512), third network device (514), or fourth network device (516)). Consequently, a switching decision is made when forwarding these packets.

The first column of Table 1 includes identifiers of forwarding equivalency class. For example, row 2 of column 1 includes the identifier A1, row 3 of column 1 includes the identifier A2, and row 4 of column 1 includes the identifier A3. Consequently, when a packet is classified into one of these classes (e.g., the forwarding equivalency classes associated with identifiers A1, A2, and A3), the packet may be matched to the row included in Table 1 having the associated identifier.

The second column of Table 1 includes link references of the links (520, 522, 524) illustrated in FIG. 5.1. The link references include identifiers of the links. As will be discussed in greater detail below, the identifiers may be used to identify information included in the link state table that indicates a status of the links. Depending on the status of the links, information used in their column 3 or 4 of the forwarding equivalency class table may be used to switch a packet. It's worth noting that in the example of Table 1, row 4 does not include a link reference because backup next hop information for the row is unavailable in this example. Consequently, if a link failure of third link (524) occurs, a pre-programmed step for performing a multi-tier failover will not be performed. Rather, the first network device (510) may instead start the multi-tier failover by using pre-computed information rather than pre-programmed to start performing the multi-tier failover.

For example, column 3 of Table 1 includes next hop information based on a first state of the network (e.g., the current state). In contrast, column 4 of Table 4 includes backup next hop information based on a second state of the network (e.g., next hop information that should be used when a link associated with the link reference is down).

The next hop information included in columns 3 and 4 of Table 1 may include any type and quantity of information. For example, the rows of these columns may specify to which device a packet that is matched to the row should be sent depending on the status of a link referenced in the row. The information included in columns 3 and 4 may specify port information (e.g., out of which port to send a packet), encapsulation information, references to other tables, and/or other types of information that may be used to directly or indirectly switch and/or forward packets.

For example, consider a scenario where first client (500) sends a packet to first network device (510) destined for second client (502). First network device (510) may first identify a forwarding equivalency classification for the packet and match that equivalency class to one of the rows of Table 1. For the purposes of this example, assume that the packet was matched to row 3 (which includes Identifier A2). Once matched, first network device (510) may then identify a status of a link using the link reference AA2 to identify appropriate link state information included in the link state table. Then, depending on the state of the link (e.g., up, down), first network device (510) either uses the next hop information included in column 3 (i.e., third network device) if the link is up or the backup next hop information included in column 4 (i.e., fourth network device) if the link is down. The switching system of first network device (510) may then switch the packet using the matched information. For the purposes of this example, assume that the link associated with link reference AA2 is down. In such a scenario, first network device (510) uses the backup next hop information (i.e., fourth network device) to switch and forward the packet. In this case, first network device (510) forwards the packet toward fourth network device (516) via third link (524).

TABLE 1

Example forwarding equivalency class table of first network device (510).

| Identifier | Link Reference | Next Hop | Backup Next Hop |
|---|---|---|---|
| A1 | AA1 | Second Network Device | Third Network Device |
| A2 | AA2 | Third Network Device | Fourth Network Device |
| A3 | None | Fourth Network Device | |

As noted above, the example forwarding equivalency class table of Table 1 includes references to a link state table (i.e., in column 2). Table 2 (below) shows a portion of an example link state table of first network device (510).

The first column of Table 2 includes similar identifiers to those included in the link reference column of Table 1. Accordingly, first network device may obtain one of the link references included in column 2 of table 1 and match it to one of the rows in Table 2. For example, if the link reference is AA2, first network device (510) matches to row 3 (e.g., including AA2) of Table 2.

The second column of Table 2 includes information reflecting the states of various links. In Table 2, row 2 of column 2 specifies the link state of first link (520), row 3 of column 2 specifies the link state of second link (522), and row 3 of column 2 specifies the link state of third link (524). As seen from Table 2, all of the rows are in an up state. Thus, if, for example, a packet is matched to row 3 of Table 1, then the link state for that row is considered to be up thereby causing first network device (510) to utilize the next hop information included in column 3 of Table 1 to forward the packet (e.g., towards third network device (514) via second link (522)).

TABLE 2

Example link state table of first network device (510).

| Identifier | Link State |
|---|---|
| AA1 | Up |
| AA2 | Up |
| AA3 | Up |

Now, considering a scenario as illustrated in FIG. 5.2 in which first link (520) between first network device (510) and second network device (512) fails. In this scenario, when the first link fails, the programming of the switch system of first network device (510) is no longer based on the actual network topology. Consequently, if the programming of the switch system of first network device (510) is not updated, packets received by first network device (510) and destined for second client (502) may be delayed, lost, or otherwise prevented from reaching second client (502).

However, in response to identifying that first link (520) has failed, first network device (510) begins to perform a multi-tiered failover. As discussed above, the multi-tiered failover includes (i) using pre-programmed information to modify the forwarding behavior of first network device (510), (ii) using pre-computed next hops based on theoretical conditions to modify the forwarding behavior of first network device (510), (iii) performing a full update of the programming of the switching system of first network device (510) in response to determining that first link (520) is down, and continuously updating the programming of the switching system in accordance with standards based routing. The rate at which each of these tiers may be performed is consistent with this ordering (e.g., fastest to slowest).

To use pre-programmed information to modify the forwarding behavior of first network device (510), first network device (510) updates its link state table as shown in Table 3 (below).

TABLE 3

Example updated link state table of first network device (510) after failure of first link (520).

| Identifier | Link State |
|---|---|
| AA1 | Down |
| AA2 | Up |
| AA3 | Up |

As seen from Table 3, the link state of the first link (520) (e.g., associated with identifier AA1) has been updated to indicate that the link is down. Consequently, when packets that are classified in forwarding equivalency classification A1, the packets are switched and forwarded using the backup next hop information in row 2 of Table 1. In other words, first network device (510) begins to switch the packets towards third network device (514) via second link (522) rather than towards second network device (512) via the now-down first link (520).

This update may be performed extremely quickly because only a single field of a table is updated. By having multiple rows of Table 1 include references to row 2 in Table 2, complex forwarding behavior for large numbers of packets may be quickly updated.

After modifying the switching behavior of first network device (510) using pre-programmed information, first network device (510) next uses pre-computed information to further reprogram its switching system. For example, consider a scenario where, prior to the failure of first link (520), first network device pre-computed a backup next hop in the event that third link (524) fails. As noted above, the forwarding equivalency class table of Table 1 does not include a backup next hop for a failure of third link (524).

If third link (524) were to fail, then first network device (510) may use the precomputed backup next hop (e.g., stored in storage/memory) to quickly reprogram the switching system of first network device. For example, the forwarding equivalency table of first network device (510) may be updated as shown in Table 4 (below).

TABLE 4

Example updated forwarding equivalency class table of first network device (510) after being updated based on a determination that third link (524) failed.

| Identifier | Link Reference | Next Hop | Backup Next Hop |
|---|---|---|---|
| A1 | AA1 | Second Network Device | Third Network Device |
| A2 | AA2 | Third Network Device | Fourth Network Device |
| A3 | None | Third Network Device | |

As seen in Table 4, the fourth row has been updated to indicate that packets classified in forwarding equivalency class A3 are to be forwarded toward third network device (514) rather than fourth network device (516).

After updating the forwarding behavior of first network device (510) using pre-programmed and pre-computed information, first network device (510) next updates its entire programming. This process may be resource intensive and take into account the totality of the network environment (or, at least, first network device's (510) understanding of the network environment). For example, first network device (510) may reprogram its forwarding equivalency class table as shown in Table 5.

TABLE 5

Example updated forwarding equivalency class table of first network device (510) after being updated based on totality of network environment.

| Identifier | Link Reference | Next Hop | Backup Next Hop |
|---|---|---|---|
| A1 | None | Third Network Device | |
| A2 | None | Third Network Device | |
| A3 | None | Third Network Device | |

As seen in Table 5, because only second link (522) remains operational, the forwarding equivalency class table has been updated to indicate that (i) all packets should be forwarded via third network device (514) and (ii) no backup next hops exist. The link state table may be similarly updated to reflect that only second link (522) is in an up state.

After updating these tables, first network device (510) may begin to perform standards based updating of its forwarding behavior as the network topology changes. For example, if the first link (520) or third link (524) return to an up state, then first network device (510) may perform a full update of its packet forwarding behavior by computing next hops, backup next hops, etc. for its switching system.

End of Example

Using the processes illustrated with respect to FIGS. 5.1-5.2, a network device in accordance with embodiments disclosed herein may more quickly update its packet forwarding behavior in response to changes in its network environment. By doing so, undesirable forwarding behavior may be avoided and/or reduced.

While the example described with respect to FIGS. 5.1-5.2 has been illustrated as including the use of specific types of tables having specific contents, one of ordinary skill in the art will appreciate that the tables utilized by switching systems may, in fact, be implemented using other types of data structures (e.g., lists, unstructured data, databases, etc.), may include different contents than that described above, and may include additional and/or less information. The specific contents of the tables utilized by switching systems may depend on the algorithms implemented by the switching systems for utilizing data stored in tables to ascertain how to switch, forward, or otherwise respond to received packets.

As discussed above, a system in accordance with embodiments disclosed herein may include different types of devices including, for example, network devices. In one or more embodiments disclosed herein, a network device is a physical device that includes and/or is operably connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 22, FIG. 1.1) include, but are not limited to, a network switch, a router, a multilayer switch, a fiber channel device, an InfiniBand® device, etc. A network device (e.g., 22, FIG. 1.1) is not limited to the aforementioned specific examples.

In one or more embodiments disclosed herein, a network device (e.g., 22, FIG. 1.1) includes functionality to receive packets (e.g., frames, packets, tunneling protocol frames, etc.) at any of the physical network interfaces (i.e., ports) of the network device (e.g., 22, FIG. 1.1) and to process the packets. In one or more embodiments, processing a packet includes, but is not limited to, a series of one or more table lookups (e.g., longest prefix match (LPM) lookups, forwarding information lookups, etc.) and corresponding actions (e.g., forward from a certain port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop packets); (ii) whether to mirror the packets; and/or (iii) determine how to route/forward packets in order to transmit the packets from an interface (e.g., out of a port) of the network device (e.g., 22, FIG. 1.1). The switching system (106) of FIG. 1.2 may perform all, or a portion, of the pipeline processing.

In one or more embodiments disclosed herein, a network device (e.g., 22, FIG. 1.1) also includes and/or is operably connected to device storage and/or device memory (i.e., non-transitory computer readable mediums used to provide persistent storage resources and/or memory resources) storing software and/or firmware.

Such software and/or firmware may include instructions which, when executed by the one or more processors of a network device (e.g., 22, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 22, FIG. 1.1) is part of a network (e.g., 20, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network devices (e.g., 22, FIG. 1.1)) that facilitate network connectivity for one or more operably connected devices (e.g., computing devices, data storage devices, other network devices, etc.). In one or more embodiments, the network device (e.g., 22, FIG. 1.1) and other devices within and/or connected to the network (e.g., 20 FIG. 1.1) are arranged in a network topology. In one or more embodiments, a network topology is an arrangement of various elements of a network and/or devices that obtain services from the network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

Figure 6:
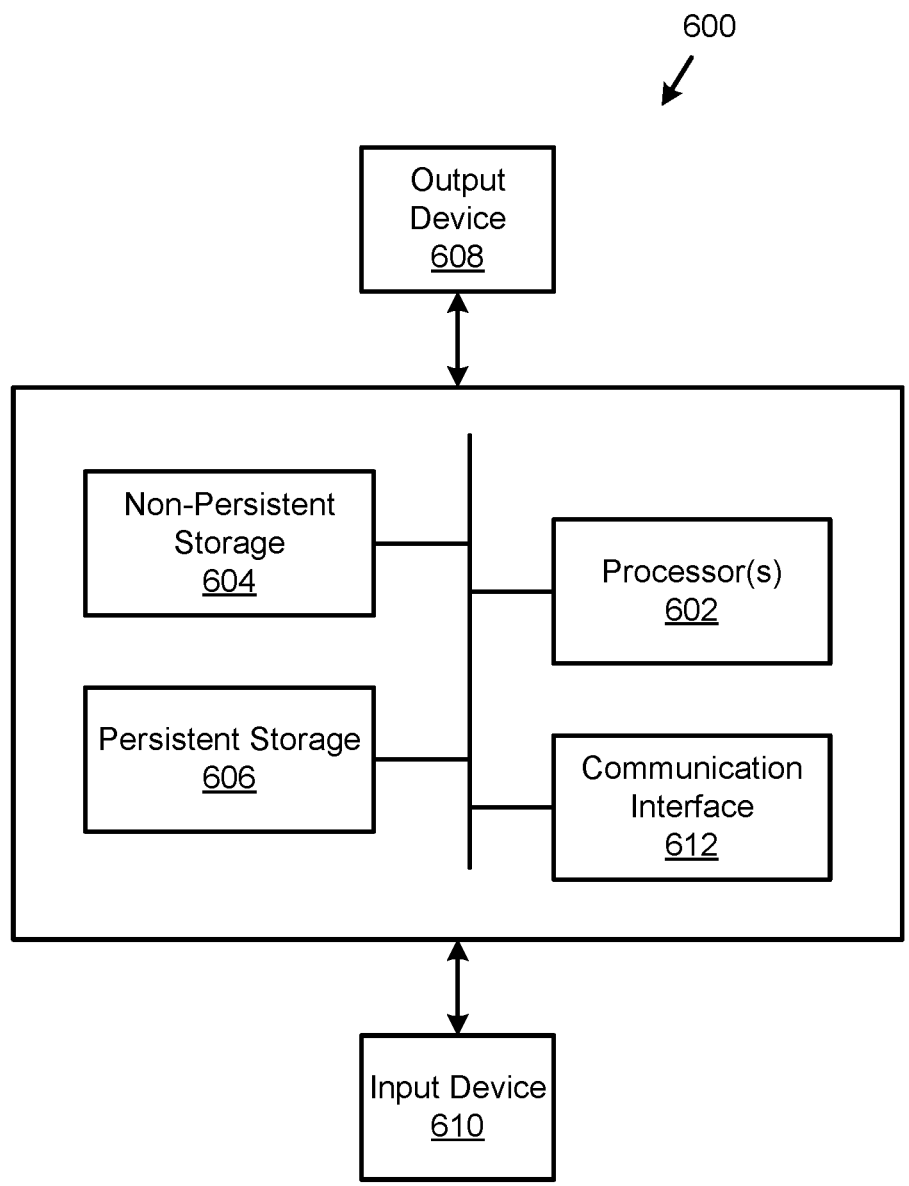
FIG. 6 shows a diagram of a computing device in accordance with one or more embodiments disclosed herein.

FIG. 6 shows a diagram of a computing device in accordance with one or more embodiments disclosed herein. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment disclosed herein, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment disclosed herein, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments disclosed herein may provide a network device and/or method that provide packets switching services that are responsive to changes in network topology. For example, embodiments disclosed herein may provide a network device that performs a multi-tiered next hop failover process when a link failure is identified. By doing so, a network device may update its packet forwarding behavior in a manner that reduces undesirable packet switching and forwarding (e.g., directing packets toward the failed link). By doing so, the impacts of undesirable packet switching and forwarding (e.g., packet loss, packet delays, etc.) may be reduced.

Thus, embodiments disclosed herein may address the problem of dynamically changing network conditions by increasing the speed at which network devices update their packet switching and forwarding behavior in response to changes in network topology.

While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope of embodiments described herein should be limited only by the attached claims.

What is claimed is:

1. A network device for forwarding packets in a network comprising an adjacent device connected to the network device via a link, comprising:
  a switching system for directing the packets between ports of the network device, wherein a port of the ports is operably connected to the adjacent device via the link; and
  a switching system manager programmed to:
    identify a failure of the link;
    in response to identifying the failure of the link, update link state information stored in forwarding hardware of the switching system based on the failure of the link to obtain updated link state information;
    process a packet using a backup next hop in a next hop backup protected entry, wherein the next hop backup protected entry comprises a primary next hop and the backup next hop, wherein the primary next hop is associated with the link, wherein the backup next hop is selected over the primary next hop based on the updated link state information;
    update, using a pre-computed next hop, the primary next hop in the next hop backup protected entry to obtain an updated next hop backup protected entry, wherein the pre-computed next hop was determined prior to the failure of the link; and
    update the updated next hop backup protected entry using current network state information of the network, to obtain a second updated next hop backup protected entry, wherein the current network state information specifies the failure of the link.

2. A network device for forwarding packets as part of a network comprising an adjacent device connected to the network device via a link, comprising:
  a switching system for directing the packets between ports of the network device, wherein a port of the ports is operably connected to the adjacent device via the link; and
  a switching system manager programmed to:
    identify a failure of the link;
    in response to identifying the failure of the link, perform a multi-tiered next hop failover of the switching system, by updating link state information and updating forwarding behavior of the switching system, based on the failure of the link to obtain an updated switching system that does not forward the packets using the failed link; and
    forward a portion of the packets using the updated switching system.

3. The network device of claim 2, wherein the link state information is stored in forwarding hardware of the switching system and is updated based on the failure of the link.

4. The network device of claim 3, wherein, after updating the link state information, the switching system manager is programmed to perform a first programming of the forwarding hardware using pre-computed backup next hops to update the forwarding behavior of the switching system associated with a first plurality of entries.

5. The network device of claim 4, wherein performing the first programming comprises:
  modifying at least a portion of the first plurality of entries in the forwarding hardware based on the pre-computed backup next hops.

6. The network device of claim 4, wherein the pre-computed backup next hops are based on network state information of the network prior to the failure of the link and wherein backup next hops of the switching system update are based on current network state information.

7. The network device of claim 4, wherein performing the multi-tiered next hop failover of the switching system further comprises:
  after performing the first programming of the forwarding hardware:
    computing, using current network state information of the network, a switching system update, and
    performing a second programming of the forwarding hardware using the switching system update to update the forwarding behavior of the switching system.

8. The network device of claim 2, wherein performing the multi-tiered next hop failover of the switching system comprises:
- deactivating a first group of pre-programmed next hops in the switching system;
- activating a second group of pre-programmed next hops in the switching system that are backups for the first group of pre-programmed next hops;
- reprogramming a third group of pre-programmed next hops in the switching system based on potentially stale network information; and
- reprogramming at least a portion of pre-programmed next hops in the switching system based on current network state information.

9. The network device of claim 8, wherein the first group of pre-programmed next hops is deactivated and the second group of pre-programmed next hops is activated by changing a single field of a single entry of a table of the switching system.

10. The network device of claim 8, wherein the third group of pre-programmed next hops is reprogrammed by modifying a plurality of entries of a second table of the switching system.

11. The network device of claim 8,
- wherein the first group of pre-programmed next hops is deactivated and the second group of pre-programmed next hops is activated by changing a single field of a single entry of a table of the switching system; and
- wherein the third group of pre-programmed next hops is reprogrammed by modifying a plurality of entries of a second table of the switching system.

12. A method of forwarding packets by a network device of a network topology comprising at least one adjacent device connected to the network device via a link, comprising:
- identifying a failure of the link;
- in response to identifying the failure of the link, performing a multi-tiered next hop failover of a switching system of the network device based on the failure of the link to obtain an updated switching system that does not forward the packets using the link, wherein performing the multi-tiered next hop failover of the switching system comprises:
  - updating link state information based on the failure of the link, and
  - updating forwarding behavior of the switching system using pre-computed information; and
- forwarding a portion of the packets using the updated switching system.

13. The method of claim 12, wherein the link state information is stored in forwarding hardware of the switching system.

14. The method of claim 13, wherein the forwarding behavior is updated after updating the link state information and is updated by performing first programming of the forwarding hardware using the pre-computed information to update forwarding behavior of the switching system associated with a first plurality of entries, and wherein the pre-computed information comprises pre-computed backup next hops.

15. The method of claim 14, wherein performing the first programming comprises:
- modifying at least a portion of the first plurality of entries in the forwarding hardware based on the pre-computed backup next hops.

16. The method of claim 15, wherein the pre-computed backup next hops are based on network state information of the network prior to the failure of the link and wherein backup next hops of the switching system update are based on current network state information.

17. The method of claim 14, wherein performing the multi-tiered next hop failover of the switching system further comprises:
- after performing the first programming of the forwarding hardware:
  - computing, using current network state information of the network, a switching system update, and
  - performing second programming of the forwarding hardware using the switching system update to update forwarding behavior of the switching system.

18. The method of claim 12, wherein performing the multi-tiered next hop failover of the switching system comprises:
- deactivating a first group of pre-programmed next hops in the switching system;
- activating a second group of pre-programmed next hops in the switching system that are backups for the first group of pre-programmed next hops;
- reprogramming a third group of pre-programmed next hops in the switching system based on potentially stale network information; and
- reprogramming at least a portion of pre-programmed next hops in the switching system based on current network state information.

19. The method of claim 18, wherein the first group of pre-programmed next hops is deactivated and the second group of pre-programmed next hops is activated by changing a single field of a single entry of a table of the switching system.

20. The method of claim 18, wherein the third group of pre-programmed next hops is reprogrammed by modifying a plurality of entries of a second table of the switching system.

* * * * *